United States Patent [19]

Bourne

[11] 3,941,677

[45] Mar. 2, 1976

[54] ELECTROLYTIC REGENERATION CELL

[75] Inventor: Joseph R. Bourne, Dewitt, N.Y.

[73] Assignee: Carrier Corporation, Syracuse, N.Y.

[22] Filed: June 27, 1974

[21] Appl. No.: 483,721

[52] U.S. Cl. ................ 204/272; 204/269; 204/275
[51] Int. Cl.² ......................................... C25B 9/00
[58] Field of Search .......... 204/260, 267, 272, 149, 204/269, 275

[56] References Cited
UNITED STATES PATENTS 3,793,171  2/1974  Zabolotny et al.................. 204/130

Primary Examiner—G. L. Kaplan
Assistant Examiner—W. I. Solomon
Attorney, Agent, or Firm—J. Raymond Curtin; Frank N. Decker

[57] ABSTRACT

Apparatus for electrolyzing a liquid having an electrolytically regeneratable ionic oxidizing agent, the apparatus including an anode having a tubular portion and a cathode having a cylindrical portion inside the tubular portion of the anode. The opposing surfaces of the tubular anode portion and the cylindrical cathode portion are substantially uniform and concentric about a common axis. In one embodiment, the anode and cathode are each made of a plurality of portions, with means for electrically connecting anode-cathode pairs of said portions in series.

1 Claim, 4 Drawing Figures

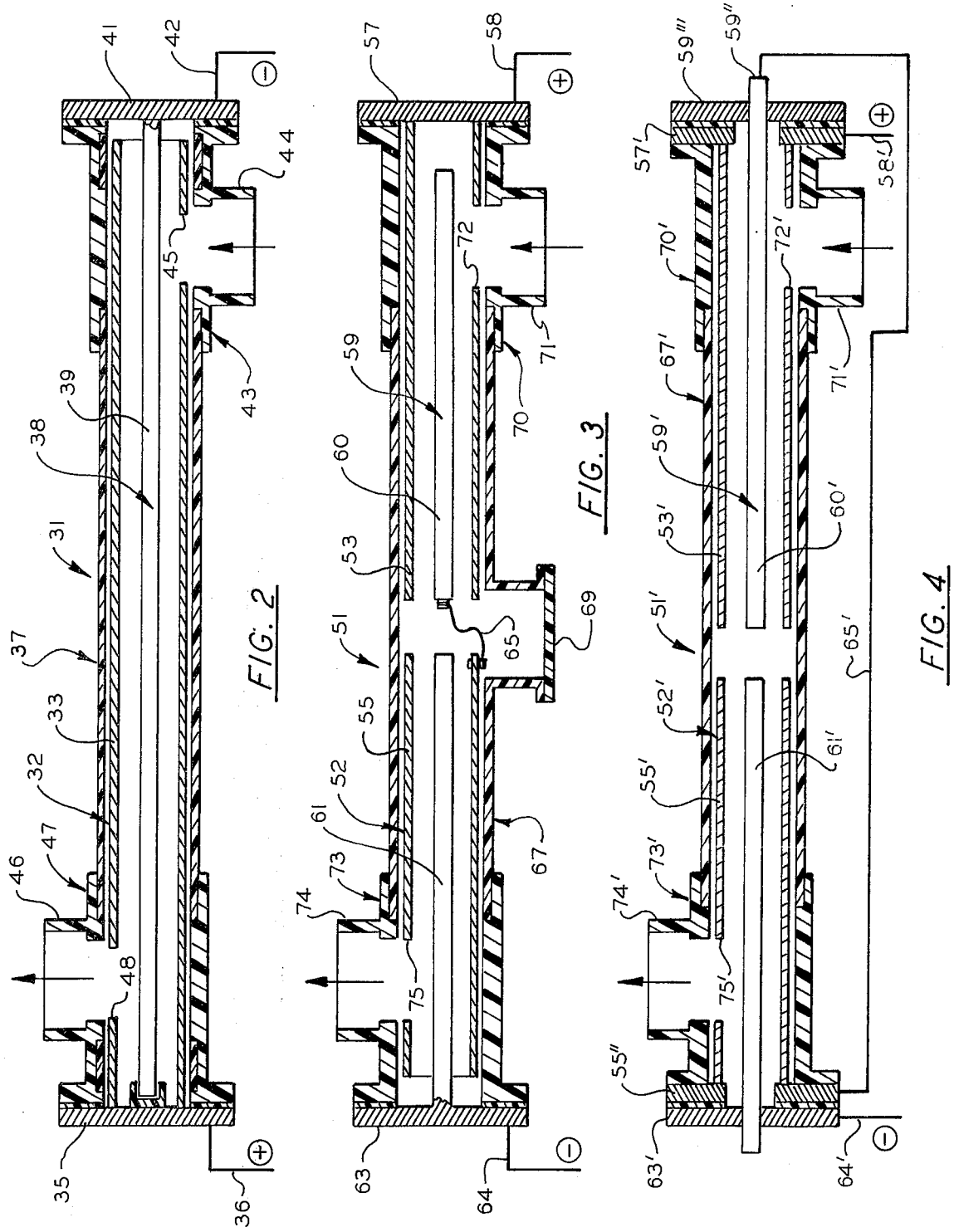

ial anode positioned adjacent a transparent casing and a cylindrical cathode extending along the axis of the anode. U.S. Pat. No. 3,718,540 discloses an electrolysis cell which comprises tubular cathode and a generally cylindrical anode extending along the axis of the cathode and terminating in a point. Water swirls through the cell due to the arrangement of the inlet passages. Other patents disclosing similar electrolytic cells include U.S. Pat. Nos. 1,020,001, 3,457,152, and 3,528,905.

ELECTROLYTIC REGENERATION CELL

BACKGROUND OF THE INVENTION

1. Field of the Invention

The present invention relates to apparatus for electrolyzing an electrolytically regeneratable substance included in a liquid, and in particular to apparatus for elecctrolyzing an electrolytically regeneratable inonic oxidizing agent included in an aqueous acid stream.

2. Description of the Prior Art

Commonly assigned U.S. Pat. No. 3,793,171 entitled "Process for Removing Pollutants from Gas Streams," which issued on Feb. 19, 1974, is directed to a process for removing oxidizable impurities from a gas stream by contacting the gas stream in a mass transfer relationship with an aqueous acid stream containing an electrolytically regeneratable ionic oxidizing agent, so that the oxidizing agent reacts with the impurities to destroy the latter. The oxidizing capacity of the ionic oxidizing agent is reduced by the preceding reaction because the valence state of the oxidizing agent decreases. Therefore, the ionic oxidizing agent is electrolytically regenerated to a valence state higher than that to which it has been reduced to restore its oxidizing capacity. The regenerated ionic oxidizing agent is then recirculated in a mass transfer relationship with the gas stream. The nature of the ionic oxidizing agent and of the chemical reactions which occur in the foregoing process are described in detail in the cited patent.

The advantages of incorporating electrolytic regeneration apparatus in a system for practicing the preceding process are explained in the patent. First, regeneration is explained as being rapid and efficient. Second, some destruction of the objectionable oxidizable material occurs at the electrodes of the regeneration apparatus. Moreover, electrolytic regeneration is relatively inexpensive, it does not require additional external chemicals, operation of the apparatus can be accomplished at ambient temperatures, and this method provides a simplified means for a continuous pollution control cycle.

The electrolytic regeneration apparatus used in the process described above thus includes an electrolytic cell having one or more cathodes and corresponding, cooperating anodes. The valence of the ionic oxidizing agent decreases at the cathode of the cell as the ions accept electrons, and the valence of the ions at the anode increases as the ions release electrons. Since the purpose of the cell is to increase the valence of the ionic oxidizing agent, the rate at which the valence of the ions at the cathode is decreased must be inhibited, and this can advantageously be accomplished by making the anode area much larger than the cathode area. Prior electrolytic cells previously used for practicing the foregoing process were similar to electrolytic cells used in the art of electroplating. Accordingly, these cells comprised a set of perforated flat anode plates suspended in a tank of acid, and a set of smaller cathodes suspended in the spaces between the anode plates. The regeneration apparatus for the foregoing process should ideally regenerate the oxidizing agent at a rapid rate so as not to impede a high flow rate of liquid through the system, and with a minimal usage of power. To attain the first of these objectives, the apparatus should electrolyze the acid solution while the solution is flowing. Electrolytic cells are known for purifying flowing water. For example, U.S. Pat. No. 3,378,479 described an electrolytic cell having a mesh-like tubu- The second objective of the ideal regeneration apparatus relates to its electrical efficiency, which can be defined as the amount of oxidant produced (i.e. regenerated) per ampere of current (alternatively, such efficiency can be expressed as the coulombic efficiency, or the ratio of the amount of oxidant actually produced and the amount of oxidant theoretically produced as determined from the Faraday laws of electrochemistry). An increase in the electrical efficiency of the apparatus results in an increase in the effectiveness of the solution in treating air because of the increased amount of oxidant in the solution contacting the air. It has been found that the electrical efficiency of an electrolytic regeneration cell depends upon the uniformity of current density in the fluid being electrolyzed. The presence of edges and other irregularites in the electrodes of prior electrolytic cells has prevented uniform current density between the electrodes and has, therefore, limited their electrical efficiency.

SUMMARY OF THE INVENTION

An object of the present invention is to electrolyze electrolytically regeneratable oxidizing agents in an aqueous acid solution in an efficient and economical manner.

Another object of the invention is to provide an improved apparatus for elctrolyzing electrolytically regeneratable oxidizing agents in an aqueous acid solution circulating through an air treatment system.

A further object is to provide apparatus of the preceding type which regenerates the oxidizing agents without impeding the flow rate of the solution.

Another object of the invention is to provide electrolytic regeneration apparatus of above type wherein oxidizing agents are rapidly produced and carried from the apparatus for circulation through the air treatment system.

Still another object is to provide apparatus of the foregoing type which has a high electrical efficiency.

A still further object of the present invention is to provide an electrolytic cell of the preceding types wherein the ratio of the anode area to the cathode area can be easily and accurately controlled.

Yet another object of the invention is to provide regeneration apparatus of the foregoing type which is susceptible to use in modular form.

Still another object of the invention is to provide an electrolytic cell which is not susceptible to corrosion by acidic materials.

An additional object is to provide apparatus for safely electrolyzing an oxidizing agent in an aqueous acid solution.

Other objects will be apparent from the description to follow and from the appended claims.

The preceding objects are achieved according to the preferred embodiment of the invention by the provision of an electrolytic cell for electrolytically regenerating ionic oxidizing agents carried in an aqueous acid solution, the valence state of the agents having been reduced by virtue of their reaction with oxidizable impurities carried in a gas stream. The electrolytic cell comprises an anode having at least one tubular portion and a cathode having a cylindrical portion disposed within each tubular anode portion. Opposing surfaces of the electrodes are uniform and concentric about a common axis. Each electrode has a portion defining an exterior surface of the cell to which electrical connections from a power supply are attached. An inlet is provided near one end of the cell and an outlet is provided at the opposite end. Spent acid solution from the scrubber of an air treatment system is pumped into the inlet of the cell and through the passageway defined by the tubular anode portion and the cylindrical cathode portion to the outlet of the cell. As the liquid flows through the cell, it is electrolyzed and the valence of the ionic oxidizing agents in the solution is increased, thus regenerating the oxidizing agents.

BRIEF DESCRIPTION OF THE DRAWINGS

FIG. 2 shows in cross section an electrolytic cell according to the invention.

FIGS. 3 and 4 are side, cross-sectional views of different modifications of the invention.

DESCRIPTION OF THE PREFERRED EMBODIMENT

Figure 1:
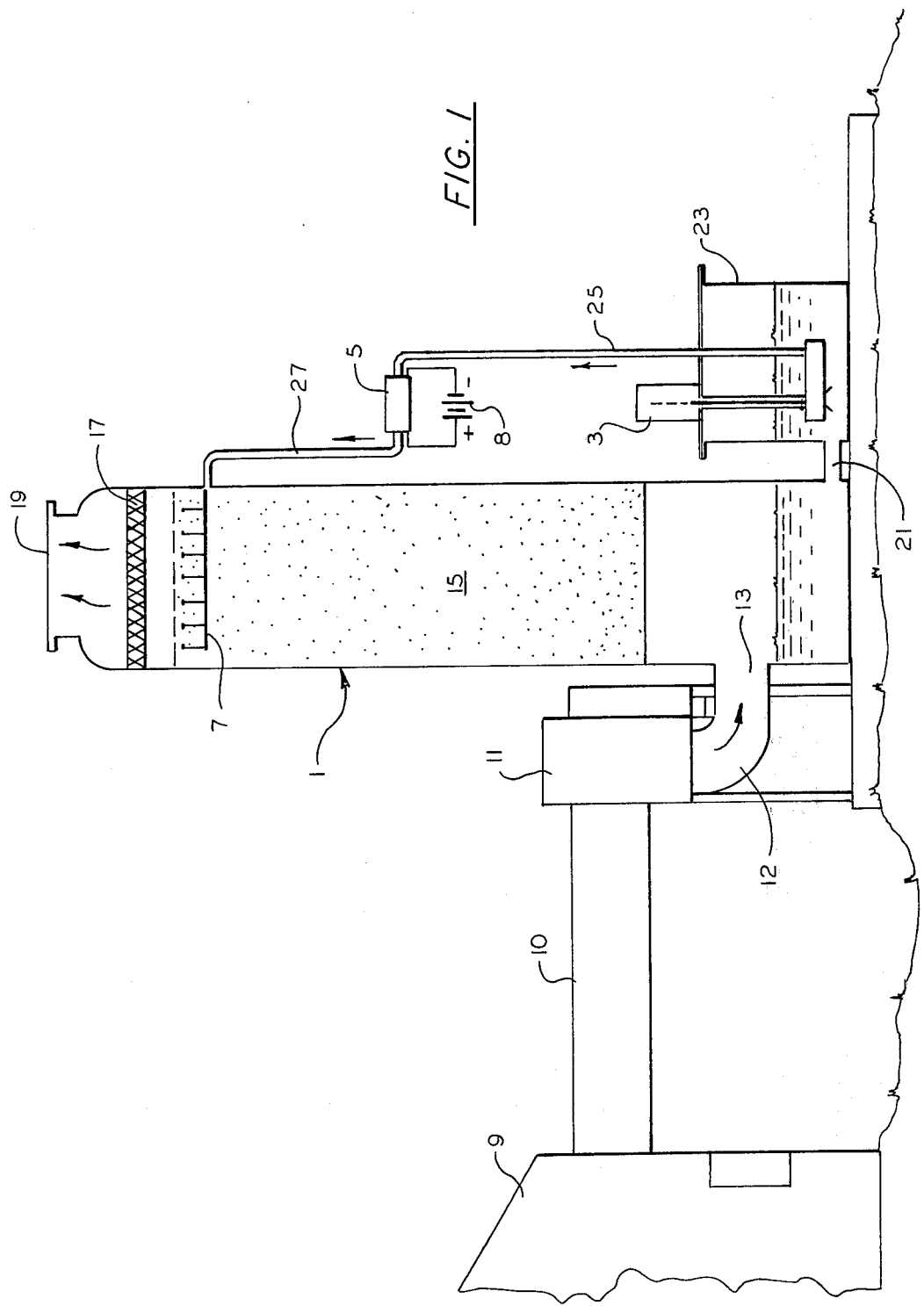
FIG. 1 shows in schematic form a gas purification system incorporating an electrolytic cell according to the present invention.

The electrolytic regeneration cells described below comprise anodes having tubular portions and cathodes having cylindrical portions extending along the axes of the anodes. Opposing surfaces of the electrode portions are uniform and concentric about a common axis. Aqueous acid solution carrying electrolytically regeneratable ionic oxidizing agents whose oxidizing capacity has been reduced, flows into the tubular anode portion and proceeds at a relatively high velocity across the surfaces of the electrodes of the cell. The valence state of the ionic oxidizing agent in the solution is increased by virtue of the electrolytic reaction in the cell, and the regenerated solution flows out of the cell. Gases produced by virtue of the preceding reaction are carried with the liquid and are vented downstream of the cell. The electrolytic reaction occurs continuously and rapidly as the liquid passes through the cell so that the size of the cell is relatively small. Characteristics of the cell relating to its geometry, construction and functioning are described below.

The electrolytic regeneration apparatus which is the subject of the present invention finds particular application in air purification systems of the type shown schematically in FIG. 1. Referring to this figure, a system is depicted which includes a scrubber 1 wherein a waste gas stream is placed in a mass transfer relationship with an aqueous acid stream containing an electrolytically regeneratable ionic oxidizing agent. This agent reacts with and destroys impurities in the air stream. The system further includes a pump 3 for circulating an acid solution containing the foregoing oxidizing agent, a regenerator or electrolytic cell 5 which is the subject of the present invention and serves to electrolytically regenerate the oxidizing agent, and a distributor 7 for distributing the acid solution across the area of the scrubber. Regenerator 5 is energized by a low voltage direct current power source 8. Air containing odorous materials and other pollutants emanates from a source 9 and flows through a series of ducts 10, 11 and 12, and through an air inlet 13 into scrubber 1. A bed of packing 15 extends upwardly from a support near the lower portion of scrubber 1 to a level near the uppermost part of distributor 7. Air from duct 13 flows upwardly through packing 15 wherein it contacts the acid solution flowing downwardly from distributor 7. The treated gas seeps through a demisting apparatus 17 in which liquid droplets are filtered from the air stream, and thence through outlet 19 into the atmosphere.

The acid solution referred to above is preferably an aqueous acid stream containing an electrolytically regeneratable ionic oxidizing agent as discussed more fully in previously cited U.S. Pat. No. 3,793,171. The acid solution, whose oxidizing agent is at the higher of its possible valence states, flows from distributor 7 downwardly through packing 15 and the oxidizing agent reacts with and oxidizes oxidizable impurities in the waste gases moving upwardly through the packing. Spent acid falls to the base of scrubber 1 and proceeds through a drain 21 into a receiving tank 23. Pump 3 moves the spent acid solution through a pipe 25 into regenerator 5 wherein the liquid is electrolyzed to regenerate the oxidizing agents in the solution. The acid solution then proceeds back to distributor 7 through a pipe 27.

Regenerator 5 is an essential part of the foregoing system for it makes possible the continuous recycling of the acid solution and the oxidizing agents carried thereon. The rate at which the regenerator can restore the oxidizing agents to the valence state necessary to render the oxidizing potential of the agent sufficient to satisfactorily oxidize impurities in the gas stream being treated, generally controls the rate at which the gas stream can be treated. The functioning and electrical efficiency of the regenerator thus, in large part, controls the functioning and efficiency of the entire system.

Proceeding now to FIG. 2, an electrolytic regeneration cell or regenerator 31 is shown. The cell comprises an anode 32 having a tubular portion 33 fabricated from lead and a flange 35 supporting the tubular portion. Flange 35 defines an exterior surface of the cell to which an electrical connection 36 from low voltage power source 8 is attached. A cylindrical, protective casing 37 surrounds tubular anode portion 33 and is fabricated from some appropriate, sturdy material such as polyvinyl chloride. A cathode 38 includes a cylindrical portion 39 in the form of an elongate copper rod having a protective lead coating. Cylindrical cathode portion 39 is supported by a flange 41. Flange 41 is constructed from lead and is disposed at the opposite end of the cell from flange 35 which supports the anode. Flange 41, like flange 35, has an exterior surface to which an electrical connection 42 from the low voltage direct current power source is attached. The opposing surfaces of anode portion 33 and cathode portion 39, i.e. the inner surface of the former element and the outer surface of the latter element, are uniform and concentric about a common axis. The term uniform as used herein refers to an imperforate, substantially smooth surface which is generally devoid of irregularities. Such construction results in the previously discussed uniform current density needed for a high electrical efficiency of the regenerator. The cathode and anode are electrically insulated from each other so that any current passing therebetween is through liquid in the cell.

A flanged cylindrical section 43 forms an end of casing 37, and includes a conduit 44 extending radially toward cell 31. An opening 45 in tubular anode portion 33 is aligned with conduit 44 to admit solution into the passageway between electrode portions 33 and 39. Similarly, a discharge conduit 46 is provided in a second flanged cylindrical casing section 47 near the opposite end of the cell from the inlet. An opening 48 in anode portion 33 is aligned with conduit 46 for directing liquid thereto.

When the D.C. power source is connected across electrodes 32 and 38, and electric potential is established across the anode and cathode so that a desired current flow from the anode to the cathode occurs. The electrodes of cell 31 shown in FIG. 2 are designed to carry a current flow of, for example, 1000 amps with a voltage drop of 3 volts from the anode to the cathode when an aqueous acid solution of the type used in the system shown in FIG. 1 flows through the cell.

Cost studies have shown that power supplies having equal power outputs vary in cost according to the current output of the power supply, so that it is less expensive to produce low amperage, high voltage power than it is to produce high amperage, low voltage power. In order to make use of the less expensive power supplies, the inventor has designed a modification of cell 31 wherein the electrodes are connected in series so that a lower amperage requirement is placed on the power source than in the preceding embodiment, although the power source must supply the reduced amperage at a higher voltage. Referring to FIG. 3, there is shown an electrolytic cell 51 which includes an anode 52 having a pair of aligned, coaxial, tubular anode portions 53 and 55 which are insulated from each other. Anode portion 53 is supported at one end by a flange 57 which defines an exterior surface of the cell to which an electrical connection 58 from the power supply is attached. Cell 51 further includes a cathode 59 comprising a pair of aligned cylindrical cathode portions 60 and 61 which are fabricated from lead coated copper rods and which extend along the axes of the tubular anode portions 53 and 55 respectively. Cathode 59 further includes a lead flange 63 from which cathode portion 61 extends. Flange 63 also defines an exterior surface of the cell to which an electrical connection 64 from the power supply is attached. The means of support of anode portion 55 and cathode portion 60 are not shown, but they should comprise means which insulate elements 55 and 59 from the other electrode portions and which are of sufficient strength and durability. Cell 51 thus comprises two anode-cathode pairs, e.g. anode portion 53 and cathode portion 60, and anode portion 55 and cathode portion 61. The opposing surfaces between which current flows of each anode-cathode pair are uniform and concentric about a common axis as discussed hereinbefore. These electrode pairs are connected in series by an electrical connector 65. A generally cylindrical casing 67 surrounds anode portions 53 and 55 to protect these anodes, and is preferably fabricated from a sturdy material such as polyvinyl chloride. A removable plate 69 is provided at the midsection of casing 69 to provide access to connector 65. A flanged cylindrical section 70 forms an end of casing 67, and a conduit 71 is provided in section 70 for admitting the aqueous acid solution into cell 51. An opening 72 in anode portion 53 permits the passage of the liquid into the passageway between the tubular anode portions and their concentric cathode portions. Similarly, a flanged cylindrical section 73 forming the other end of casing 67 includes a conduit 74 for discharging liquid from cell 51, and again, an aligned opening 75 is provided in anode portion 55 to permit this passage of the liquid.

The embodiment shown in FIG. 3 differs from that shown in FIG. 2 in that the latter regenerator or cell 31 includes but one anode-cathode pair, whereas in FIG. 3, the embodiment includes two anode-cathode pairs in series. For identical current requirements, cell 51 can use a less expensive power supply than that in the preceding figure. For example, if 1000 amps of current are required of each of the two cells, this could be accomplished using cell 31 with a power supply having an output of 1000 amps and 3 volts. The same net result can be accomplished with cell 51 using a power supply having an output of 500 amps at 6 volts. In the latter case, 500 amps of current flow between anode portion 53 and cathode portion 60 at a voltage drop of approximately 3 volts between these two electrodes. Then, since these electrodes are connected in series, a second current flow of 500 amps occurs between anode portions 55 and 61 at another voltage drop of approximately 3 volts. The total of amperage flowing across the liquid solution is the required 1000 amps.

A variation of the embodiment shown in FIG. 3 is illustrated in FIG. 4. Since there is substantial similarity of construction between these embodiments, the parts in the embodiment shown in FIG. 4 have been ascribed the same numerals as those of the corresponding parts in the embodiment of FIG. 3, with a prime designation. Reference is made to the description of the embodiment of FIG. 3 to explain the construction of the embodiment in FIG. 4. The main difference between the embodiments of FIGS. 3 and 4 resides in the location of connections 65 and 65'. Connection 65 is disposed within electrolytic cell 51, whereas connection 65' extends between an exterior surface on a flange 55'' (which supports tubular anode portion 55') and an exterior surface of an end 59'' of cylindrical cathode portion 59' which extends through a support flange 59'. The attachment of electrical connections to exterior portions of the respective electrodes facilitates the ease with which such attachments can be made, and avoids the deleterious effects from the acidity and motive force of the aqueous acid solution. These advantages apply not only to connections between anode-cathode pairs, but also to the exterior connections from the electrical power sources in the embodiments of FIGS. 2–4.

Each of the embodiments of the invention described above is characterized by numerous advantages. The uniform current density in the aqueous acid solution flowing through the apparatus effects a high electrical efficiency of the regeneration cell. Such efficiency reflects a high rate of regeneration for the amount of electrical energy expended. Therefore, the size of the regenerative apparatus can be kept small, and effective use is made of the aqueous acid solution in the air treatment system. Furthermore, the previously referred to anode to cathode area ratio can be controlled with ease according to the diameters of cooperating electrode portions. In addition (or alternatively) portions of either electrode can be masked off and rendered ineffective by means of some insulating material such as an appropriate plastic.

The flow of aqueous acid solution through the apparatus is fast and vigorous, so that recirculation of the solution in the air treatment system is not impeded by the apparatus. High concentrations of the oxidants do not accumulate on the electrodes because of the vigorous flow of solution, adding to the effectiveness thereof. The vigorous flow of liquid through the cell occurs across all of the surface areas of the electrodes so that the disadvantages associated with stagnant pools of solution in the cell are avoided.

The electrolytic reaction which occurs within the cell in the above system forms hydrogen gas which is highly flammable and potentially very dangerous. The apparatus according to the present invention enables the safe venting of this and any other dangerous gas without the need for any additional equipment. The gas is simply carried out of the cell by the flowing liquid and, referring to FIG. 1, simply escapes into the atmosphere through the discharge openings at the top of scrubber 1 as the acid solution flows into the scrubber. This hydrogen gas leaves the system in a highly dilute and hence safe condition because it is mixed with the relatively tremendous volume of air exiting through the same openings.

The present invention has in practice been found to be highly efficient, economical, and reliable. Since the regenerator cell lends itself to modular construction, a plurality of such cells can be connected together hydraulically and electrically in series or in parallel, should the requirements of the system require a high rate of electrolysis.

The invention has been described in detail with particular reference to preferred embodiments thereof, but variations and modifications within the spirit and scope of the invention may occur to those skilled in the art to which the invention pertains.

I claim:

1. Apparatus for electrolyzing electrolytically regeneratable ionic oxidizing agents in a fluent aqueous acid solution to increase the oxidation state of said ions, said apparatus comprising:

an anode comprising an elongated tubular member;

a cathode comprising an elongated cylindrical rod positioned inside the tubular anode, said tubular anode and said cylindrical rod cathode having opposing surfaces, said opposing surfaces being uniform, and concentric about a common axis and defining a passageway therebetween;

means for connecting said anode and said cathode to an electric energy source to impress an electric potential across said anode and said cathode to effect an electric current flow between said opposing surfaces through solution flowing in said passageway;

inlet means for admitting the aqueous acid solution into said passageway adjacent one end of said apparatus;

outlet means for discharging the aqueous acid solution from said passageway adjacent the other end of said apparatus, the exterior diameter of the rod cathode being smaller than the interior diameter of the tubular anode so that the anode area in contact with the regeneration ionic oxidizing agents in the aqueous acid solution passing through said apparatus is larger than the cathode area in contact therewith, to thereby inhibit the rate at which the valence of the ions at the cathode are reduced and increase the production of ions in a high oxidation state in the aqueous acid solution leaving the apparatus, said anode tubular member comprising a plurality of axially aligned tubular anode portions having ends substantially open to one another for free flow of said aqueous acid solution through said apparatus from one anode portion to the next anode portion, said cathode cylindrical rod comprising a plurality of axially aligned cylindrical rod cathode portions, each said cylindrical rod cathode portion being positioned inside one of said tubular anode portions to form an anode-cathode pair having opposing surfaces, and said apparatus further comprising means for electrically connecting said anode-cathode pairs in series to decrease effective current required by said apparatus.

* * * * *